Oct. 9, 1923.
H. A. YARNELL
1,470,518
BATTERY SEPARATOR
Filed April 28, 1921
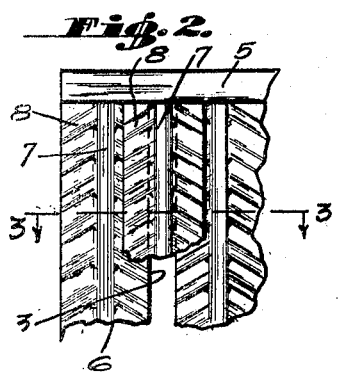
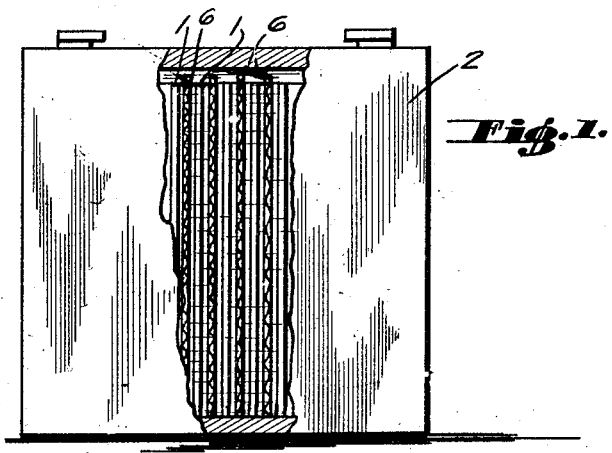
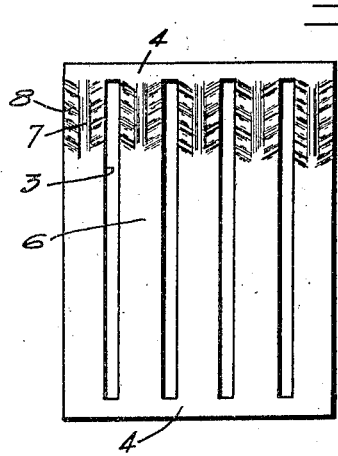
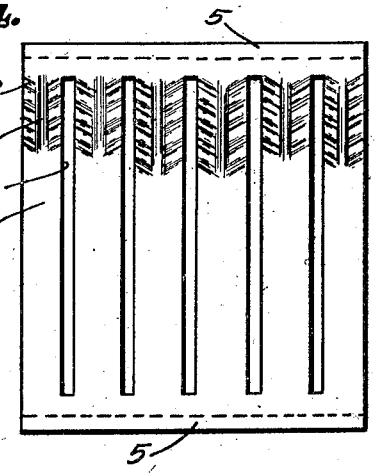
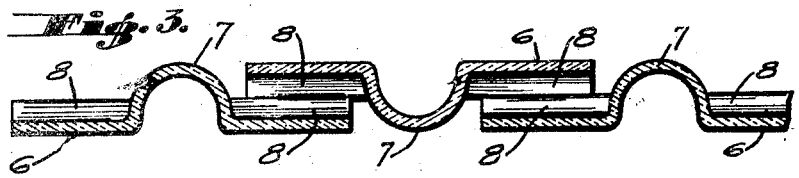
HAROLD A. YARNELL
INVENTOR.
BY
ATTORNEYS.

Patented Oct. 9, 1923.

1,470,518

UNITED STATES PATENT OFFICE.

HAROLD A. YARNELL, OF ESCONDIDO, CALIFORNIA.

BATTERY SEPARATOR.

Application filed April 28, 1921. Serial No. 465,075.

*To all whom it may concern:*

Be it known that I, HAROLD A. YARNELL, a citizen of the United States, residing at Escondido, in the county of San Diego and State of California, have invented new and useful Improvements in Battery Separators, of which the following is a specification.

This invention relates to separators employed between the positive and negative plates of storage batteries and the like, and has for its object the provision of a separator which will provide the necessary electrical insulation while permitting of free circulation of the electrolyte and preventing the clogging of the openings for the electrolyte, and also preventing the growth of mineral deposits, such as are liable to cause internal discharge of the battery.

The invention contemplates the provision of plates arranged face to face and provided with transverse corrugations co-operating to form passages through the separator formed by the plates, which will be maintained free of sediment, and which will provide for the free circulation of the electrolyte without "treeing" of the separator.

The invention will be readily understood from the following description of the accompanying drawings, in which Figure 1 is a side elevation of a battery partly broken away and showing the improved separators in operative position.

Fig. 2 is a detail plan view showing a corner of one of the separators.

Fig. 3 is a detail section on the line 3—3 of Fig. 2.

Fig. 4 is a plan view showing the two plates adapted to form a separator and before assembling the same.

In the drawings I have illustrated the improved separators as employed between the usual battery plates 1 within a suitable battery casing 2 which is adapted to contain a usual electrolyte.

The separators each comprise two plates, such as shown in Fig. 4, and said plates may be of any suitable insulating material such as rubber, celluloid, and the like. The plates may be molded in the same forming apparatus, and each is provided with longitudinally extending transversely spaced slots. One of the plates is provided with margins 4 beyond its slots 3, while the other plate is preferably provided with margins 5 beyond said slots and of an appreciably greater width, so that when the plates are placed face to face, the margins 5 may be folded over margins 4 and suitably secured thereto as by vulcanizing, cementing, etc., in order to maintain the plates in assembled relation to form a separator.

The strips 6 formed between slots 3 are provided with medial ribs 7 projecting from the plates, and said strips are corrugated as shown at 8 between said ribs and the slots 3. The corrugations are inclined with relation to ribs 7, and the corrugations of each strip at opposite sides of the ribs 7 are angularly disposed with relation to one another, as clearly shown in Fig. 2. Since the two plates forming the separator are molded in the same apparatus, it will be understood that the corrugations of the plates are similarly positioned, as clearly shown in Fig. 4.

The ribs 7 preferably project from the plates substantially twice the height of corrugations 8, as clearly shown in Fig. 3, and in assembling the plates the same are placed one upon another with the ribs of one plate extending through the slots of the other plate and overlapping corrugations at the sides of the ribs of the respective plates crossing each other, as clearly shown in Fig. 2.

It will be noted by reference to Fig. 3 that the slots 3 are of greater width than ribs 7 in order that a free passageway is provided alongside of the ribs and through the corrugations of the plates. It will be understood that the corrugations of the respective plates crossing one another will space said plates so that the corrugations form transverse passageways through the assembled separator, said passageways terminating at the spaces alongside of the ribs 7.

In a separator as thus described, he portions thereof forming ribs upon one side of the separator and grooves upon the other side thereof will afford the desired strengthening means for said separator by means of said ribs, while the grooves will allow free circulation of the electrolyte, and will also allow any dislodged active material to pass to the bottom of the separator. The corrugations which slant away from the portions 7 of the separator will provide for thorough contact of the electrolyte with the battery plates, and will also conduct the gases generated in the battery upwardly by means of the slant of the corrugations to the sides of the ribs, while permitting the dislodged active material to pass downwardly through the slanting corrugations, and thence to the grooves of the separator so as to be finally collected in the pockets at the bottom of the battery.

Various changes may be made without departing from the spirit of the invention as claimed.

What is claimed is:

1. A separator comprising overlapping plates having transverse corrugations extending toward and abutting against one another for forming openings through said separator.

2. A separator comprising overlapping plates having transverse corrugations angularly disposed relative to one another so as to space said plates and form openings through the separator.

3. A separator comprising overlapping plates having medial ribs facing one another with the edge of one plate transversely spaced from the rib of the other plate, and transverse corrugations in said plates at the sides of said central ribs.

4. A separator comprising overlapping plates having medial ribs facing one another with the edge of one plate transversely spaced from the rib of the other plate, and transverse corrugations in said plates at the sides of said central ribs angularly disposed relative to one another so as to space said plates and form openings through the separator.

5. A separator comprising plates received against one another and each comprising a plurality of transversely spaced strips laterally offset relative to one another, said strips having medial ribs with the ribs of one plate facing the ribs of the other plate and received in the spaces between the strips of the second plate, said strips also having transverse corrugations at the sides of said ribs.

6. A separator comprising plates received against one another and each comprising a plurality of transversely spaced strips laterally offset relative to one another, said strips having medial ribs with the ribs of one plate facing the ribs of the other plate and received in the spaces between the strips of the second plate, said strips also having transverse corrugations at the sides of said ribs angularly disposed relative to one another so as to space said plates and form openings through the separator.

7. A separator comprising plates received against one another and each having a plurality of transversely spaced slots forming strips between the same, the plates being assembled with said strips of the respective plates laterally offset relative to one another, said strips having medial ribs with the ribs of one plate facing the ribs of the other plate and received in the spaces between the strips of the second plate, said strips also having transverse corrugations at the sides of said ribs.

8. A separator comprising plates formed from a sheet having a plurality of transversely spaced slots forming strips between the same, said strips having projecting medial ribs and inclined corrugations at the sides of said ribs, the plates being assembled face to face and with said strips of the respective plates laterally offset relative to one another so that the ribs of one plate are received in the spaces between the strips of the second plate with the inclined corrugations of the respective plates crossing one another to form openings through the separator.

9. A separator comprising plates having a plurality of transversely spaced slots forming strips between the same, the plates being assembled with said strips of the respective plates laterally offset relative to one another, and one of said plates having margins beyond said slots adapted to be folded over the margins of the other plate in assembling the same, said strips having medial ribs with the ribs of one plate facing the ribs of the other plate and received in the spaces between the strips of the second plate, said strips also having transverse corrugations at the sides of said ribs.

10. A storage battery separator comprising a pair of plates positioned adjacent to each other, each plate being provided with a series of parallel slots, there being medial ribs formed on said plates between said slots and the width of said slots being greater than the width of said ribs.

11. A storage battery separator comprising a pair of plates positioned adjacent to each other, each plate being provided with a series of parallel slots, there being medial ribs formed on said plates between said slots and the width of said slots being greater than the width of said ribs, and transverse corrugations formed on the body of each plate between the slots and ribs.

12. In a battery separator, a plate provided with a series of substantially parallel slots, there being ribs formed on said plate between said slots, the width of which ribs is less than the width of said slots, and transversely disposed corrugations formed on the plate between each rib and the adjacent slots.

13. A separator comprising overlapping members having transverse protuberances angularly disposed relative to one another.

14. A separator comprising overlapping plates having transverse protuberances angularly disposed relative to one another.

15. In a separator, a plate having a protuberance extending along the longitudinal axis of the plate and coextensive in length therewith, and protuberances extending at intervals from the first protuberance with the protuberances at one side of the main protuberance disposed in divergent relation with respect to the protuberances at the other side.

In testimony whereof I have signed my name to this specification.

HAROLD A. YARNELL.